United States Patent [19]

Pearson

[11] Patent Number: 5,623,702
[45] Date of Patent: Apr. 22, 1997

[54] RESILIENT LENS RETAINER

[75] Inventor: Douglas H. Pearson, Rochester, N.Y.

[73] Assignee: Eastman Kodak Company, Rochester, N.Y.

[21] Appl. No.: 597,742

[22] Filed: Feb. 7, 1996

[51] Int. Cl.$^6$ .................................................. G03B 17/02
[52] U.S. Cl. ............................................... 396/6; 396/535
[58] Field of Search .................................................. 354/288

[56] References Cited

U.S. PATENT DOCUMENTS

| | | | |
|---|---|---|---|
| 3,220,308 | 11/1965 | Lareau | 88/57 |
| 5,249,082 | 9/1993 | Newman | 359/813 |
| 5,299,066 | 3/1994 | Rombult | 359/819 |
| 5,357,300 | 10/1994 | Yanagi et al. | 354/195.1 |
| 5,361,111 | 11/1994 | Yamashina et al. | 354/266 |
| 5,400,098 | 3/1995 | Rydelek | 354/288 |
| 5,436,685 | 7/1995 | Yamashina | 354/202 |
| 5,496,687 | 3/1996 | Kawamoto | 430/496 |
| 5,506,643 | 4/1996 | Tasaka et al. | 354/96 |
| 5,555,062 | 9/1996 | Pearson et al. | 354/288 |

*Primary Examiner*—Safet Metjahic
*Assistant Examiner*—Daniel Chapik
*Attorney, Agent, or Firm*—Roger A. Fields

[57] ABSTRACT

A camera comprises a taking lens having an integral collar, a main body portion including a rigid fixed lens-support for the taking lens, and a front cover portion for the main body portion including an integral lens-surround arranged at least opposite the collar to leave a space between the lens-surround and the collar. The lens-surround can be forcibly depressed into the space towards the taking lens. The resilient lens-retaining means, interconnects the lens-surround and the collar within the space, for urging the taking lens against the lens-support and for providing increased resistance when the lens-surround is forcible depressed into the space to prevent the lens-surround from disturbing the taking lens.

6 Claims, 5 Drawing Sheets

RESILIENT LENS RETAINER

CROSS-REFERENCE TO RELATED APPLICATION

Reference is made to commonly assigned copending application Ser. No. 08/419,329, entitled APPARATUS AND METHOD FOR POSITIONING FIRST-AVAILABLE FILM FRAME FOR TEST EXPOSURE IN ONE-TIME-USE CAMERA and filed Apr. 10, 1995 in the names of Douglas E. Kucmerowski and Anthony L. DiGaetano.

The cross-referenced application is incorporated into this application.

FIELD OF THE INVENTION

The invention relates generally to the field of photography, and in particular to cameras provided with a resilient lens retainer for the taking lens.

BACKGROUND OF THE INVENTION

Relatively simple inexpensive single-use or otherwise called one-time-use cameras, such as disclosed in the cross-referenced application, are available today which comprise a single-element taking lens having an integral collar, a main body portion including a rigid fixed lens-support for the taking lens, and a front cover portion for the main body portion which includes an integral dome-shaped lens-surround arranged opposite the collar to leave a small space or gap between the lens-surround and the collar. A lens-retaining ring, located within the space, is secured atop the collar to the main body portion to hold the taking lens in place over a shuttered exposure opening in the main body portion. The lens-retaining ring is intimately sandwiched between the lens-surround and the collar to fully occupy the space. Thus, an unintended blow to the lens-surround might forcibly depress the lens-surround against the lens-retaining ring to disturb the taking lens.

SUMMARY OF THE INVENTION

A camera comprising a taking lens having an integral collar, a main body portion including a rigid fixed lens-support for the taking lens, and a front cover portion for the main body portion including an integral lens-surround arranged at least opposite the collar to leave a space between the lens-surround and the collar, is characterized in that:

the lens-surround can be forcibly depressed into the space towards the taking lens; and resilient lens-retaining means, interconnects the lens-surround and the collar within the space, for urging the taking lens against the lens-support and for providing increased resistance when the lens-surround is forcible depressed into the space to prevent the lens-surround from disturbing the taking lens.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
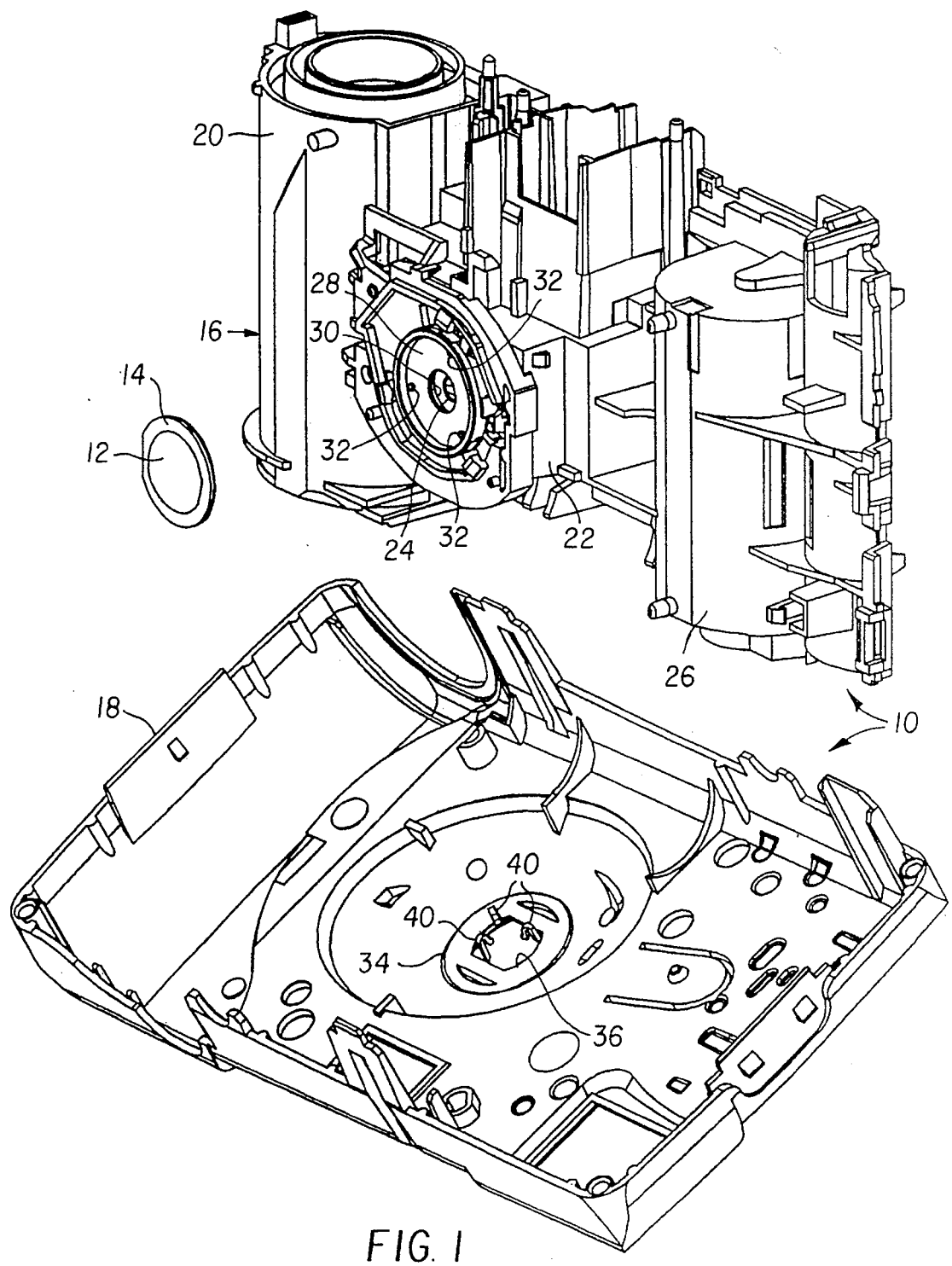
FIG. 1 is an exploded perspective view of a one-time-use camera according to a preferred embodiment of the invention, showing a front cover portion including an integral dome-shaped lens-surround provided with three resilient lens-retaining means removed from a main body portion which supports a taking lens.
Figure 2:
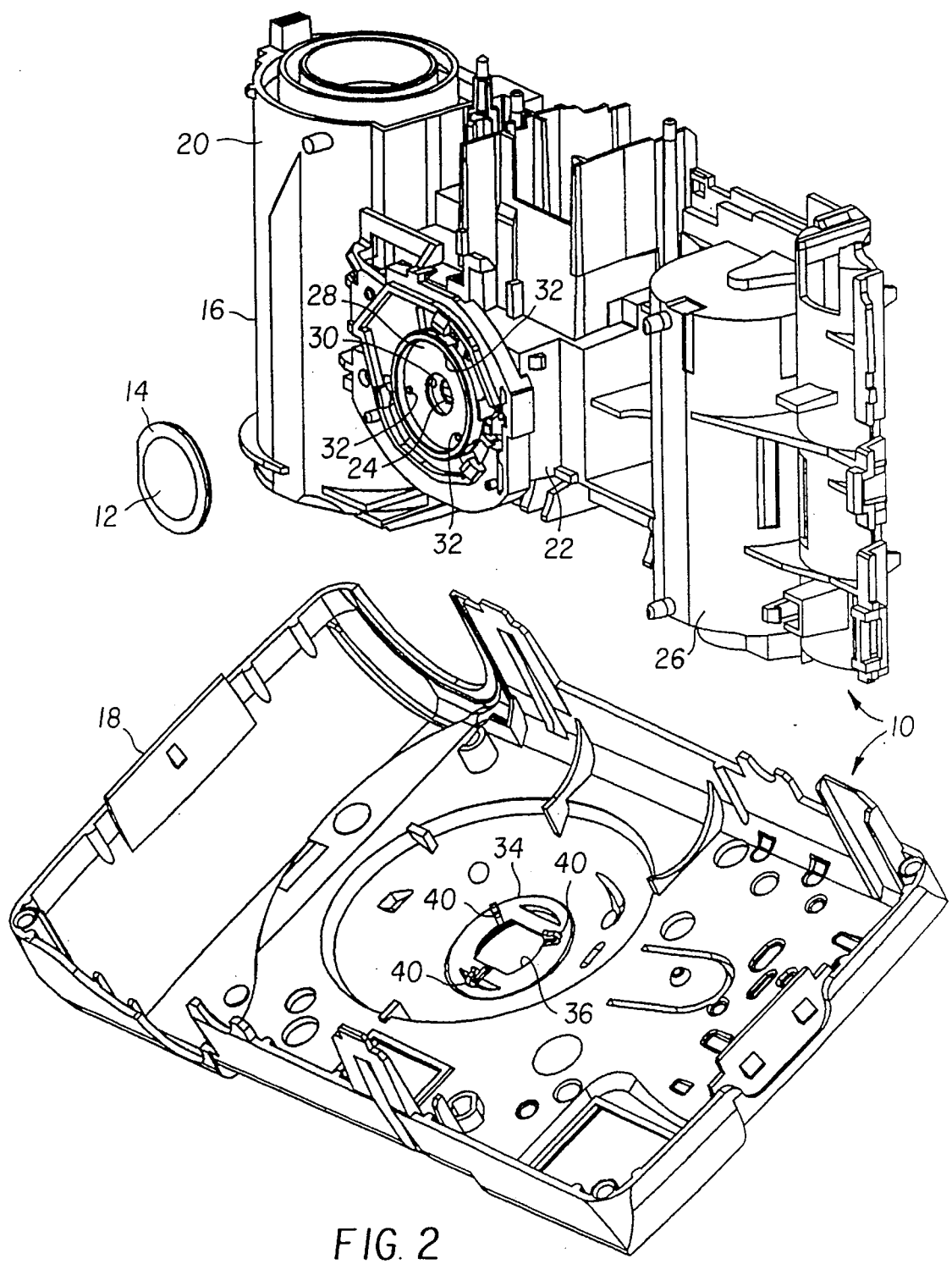
FIG. 2 is an exploded perspective view similar to FIG. 1, showing the three lens-retaining means folded against respective back-stops preparatory to connecting the front cover portion to the main body portion to secure a taking lens in place.

Referring now to the drawings, FIGS. 1 and 2 show a one-time-use camera 10 comprising a single-element taking lens 12 having an integral flat collar 14, a main body portion 16, and a mating front cover portion 18 intended to fit over the main body portion. The main body portion 16 is shown from its inside and includes a cartridge chamber 20 for a film cartridge, not shown, a film exposure chamber 22 having a shuttered exposure opening 24, and an unexposed film roll chamber 26.

An annularly rimmed lens plate 28 for the taking lens 12 has a central opening 30 aligned with the shuttered exposure opening 24. Three rigid fixed lens pads 32 of the lens plate 28 are spaced 120 degrees apart from one another about the central opening 30 to support the taking lens 12 at its collar 14 over the central opening. See FIGS. 1 and 3.

The front cover portion 18 includes an integral dome-shaped lens-surround 34 having a centered lens opening 36. When the front cover portion 18 is placed over the main body portion 16 to complete assembly of the camera 10, the lens-surround 34 (adjacent its centered lens opening 36) is arranged opposite the collar 14 of the taking lens 12 to leave a ring-shaped space 38 between the lens-surround and the collar. See FIG. 3. The lens-surround 34 is somewhat rigid. However, an unintended blow to the lens-surround 34 can forcibly depress it into the ring-shaped space 38.

Figure 3:
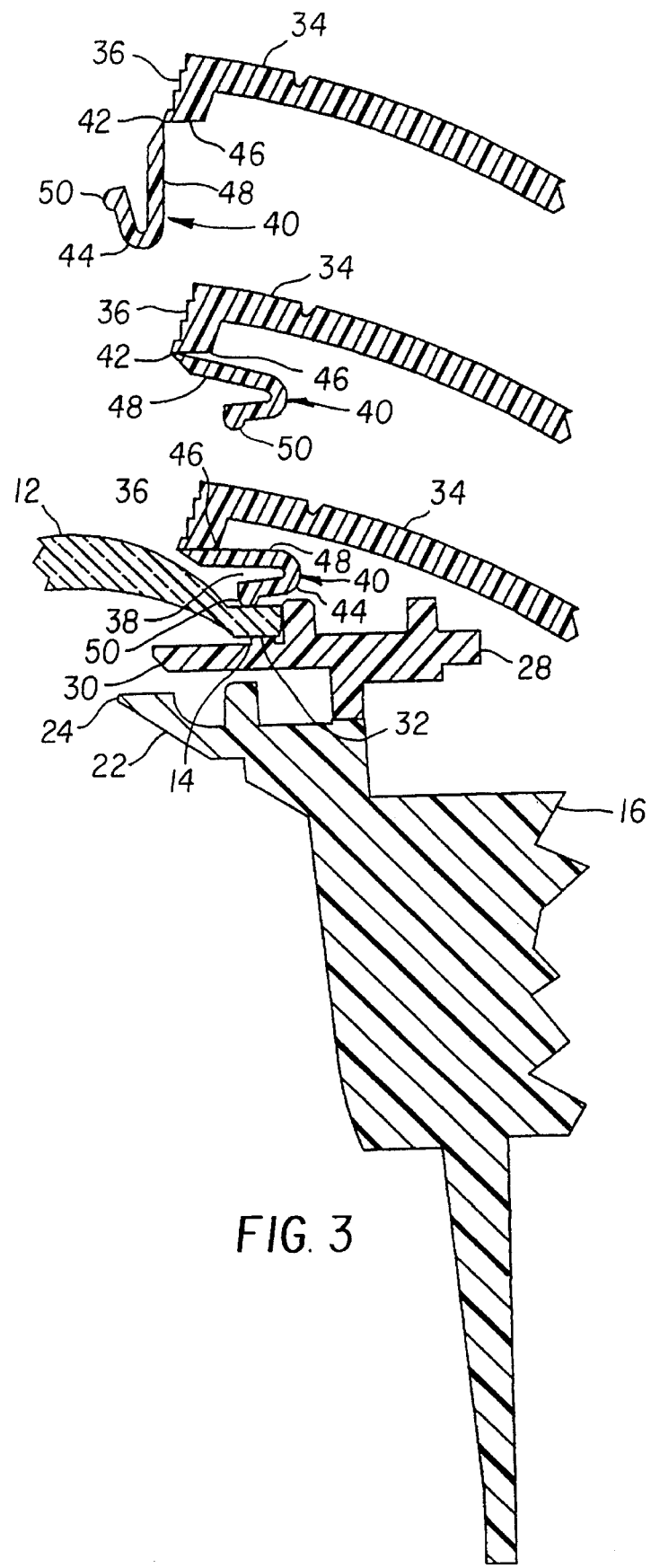
FIG. 3 is a schematic depiction of the steps involved to secure the taking lens in place.

The lens-surround 34 is integrally formed with three compliant protuberances 40 spaced 120 degrees apart from one another about the centered lens opening 36 similar to the way the three lens pads 32 are spaced about the central opening 30 in the lens plate 28. The three protuberances 40 are joined to the lens-surround 34 via respective living hinges 42 and include substantially u-shaped or v-shaped portions 44. As shown in FIGS. 1–3, the three protuberances 40 including their u-shaped portions 44 initially hang down or extend lengthwise from the lens-surround 34, but are intended to be folded at their living hinges 42 against respective back-stops 46 of the lens-surround before the front cover portion 18 is placed over the main body portion 16 to complete assembly of the camera 10. Looking at FIG. 3, it can be seen that, when the lens-surround 34 (adjacent its centered lens opening 36) is arranged opposite the collar 14 of the taking lens 12 to provide the ring-shaped space 38 between the lens-surround and the collar, each one of the u-shaped portions 44 extends sideways or radially in the ring-shaped space to make one compliant leg 48 of the u-shaped portion bear under compression against the back-stop 46 and another compliant leg 50 of the u-shaped portion bear under compression against the collar in order to firmly urge the taking lens against the lens pads 32. Thus, the u-shaped portions 44 will generate increased resistance should the lens-surround 34 be forcibly depressed, and the taking lens 12 will not be disturbed.

Figure 4:
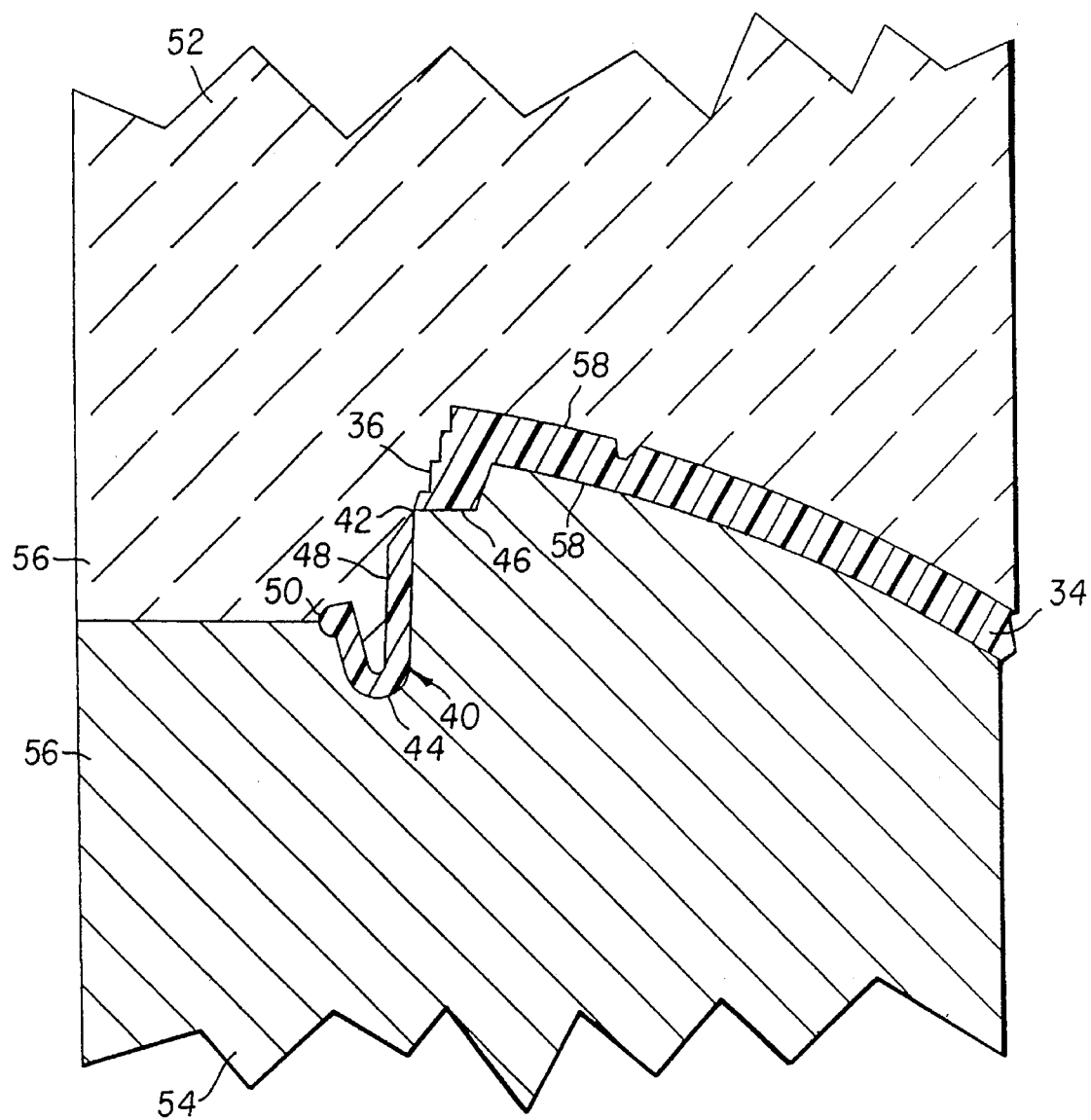
FIG. 4 is a section view of a molding device for forming the three lens-retaining means integrally with the lens-surround.
Figure 5:
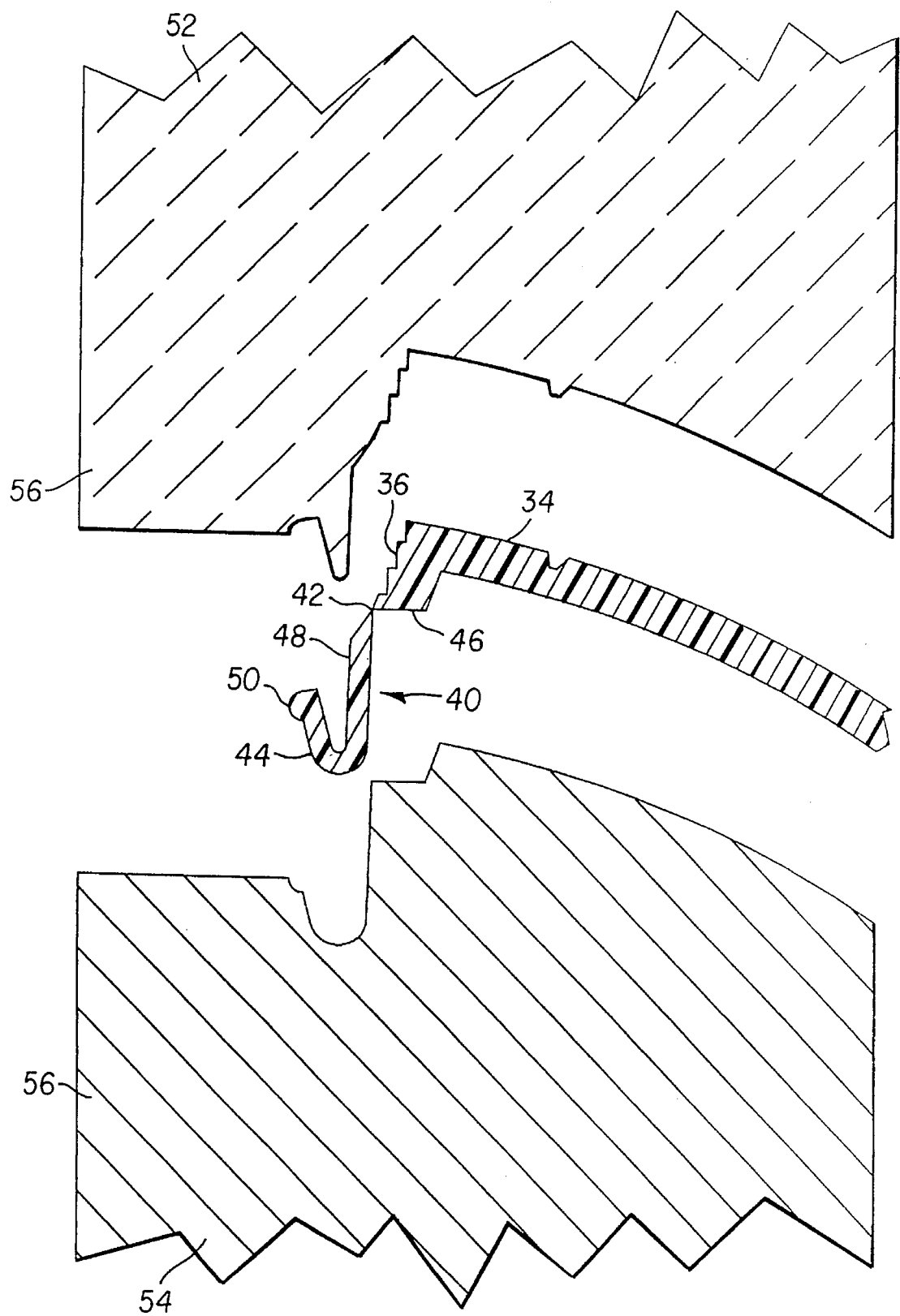
FIG. 5 is a section view similar to FIG. 4, showing the molding device separated into upper and lower mold halves to remove the lens-surround including the three lens-retaining means.

FIGS. 4 and 5 show how the lens-surround 34 is integrally formed with the three protuberances 40. A pair of upper and lower mold halves 52 and 54 of a molding device 56 are brought together as depicted in FIG. 4 to define a mold cavity 58 for the lens-surround 34 including its three protuberances 40. The protuberances 40 are formed hanging down or extending lengthwise from the lens-surround 34. When, as depicted in FIG. 5, the upper and lower mold halves 52 and 54 are separated to open the mold cavity 58, the lens-surround 34 including its protuberances 40 is removed.

The invention has been described with reference to a preferred embodiment. However, it will be appreciated that variations and modifications can be effected by a person of ordinary skill in the art without departing from the scope of the invention.

PARTS LIST 10. camera
12. taking lens
14. lens collar
16. main body portion
18. front cover portion
20. cartridge chamber
22. film exposure chamber
24. shuttered exposure opening
26. unexposed film roll chamber
28. lens plate
30. central opening
32. three lens pads
34. lens-surround
36. lens opening
38. space
40. three protuberances
42. living hinges
44. three u-shaped portions
46. three back-stops
48. one leg
50. other leg
52. upper mold half
54. lower mold half
56. molding device
58. mold cavity

I claim:

1. A camera comprising a taking lens having an integral collar, a main body portion including a rigid fixed lens-support for said taking lens, and a front cover portion for said main body portion including an integral lens-surround arranged at least opposite said collar to leave a space between said lens-surround and the collar, is characterized in that:

said lens-surround can be forcibly depressed into said space towards said taking lens; and a plurality of resilient compliant lens-retaining means, interconnects said lens-surround and said collar within said space, each for elastically urging said taking lens against said lens support and for providing increased resistance when the lens-surround is forcible depressed into said space to prevent the lens-surround from moving the taking lens.

2. A camera as recited in claim 1, wherein said lens-retaining means includes several compliant protuberances joined to said lens-surround via respective integral hinges to permit said protuberances to be formed extending from the lens-surround but to be folded against a back-stop of the lens-surround in order to urge said taking lens against said lens-support.

3. A camera as recited in claim 2, wherein each one of said protuberances has a substantially u-shaped portion which extends sideways in said space to make one leg of said u-shaped portion bear against said collar and another leg of the u-shaped portion bear against said back-stop when the protuberances are folded against the back-stop.

4. A camera as recited in claim 1, wherein said lens-surround is dome-shaped and has a centered lens opening.

5. A method of assembling a camera comprising placing a taking lens on a rigid immobile lens-support, and positioning a lens-surround opposite the taking lens to leave a space between the lens-surround and the taking lens, is characterized in that:

several compliant protuberances extending from the lens-surround are folded within the space against a back-stop of the lens-surround to urge the taking lens against the lens-support.

6. A method of assembling a camera as recited in claim 5, wherein the protuberances are folded at respective living hinge connections to the lens-surround.

* * * * *